US012781847B2

(12) United States Patent
Marcos Izquierdo et al.

(10) Patent No.: US 12,781,847 B2
(45) Date of Patent: Nov. 3, 2026

(54) OIL MANIFOLD FOR A MECHANICAL REDUCTION GEAR OF A TURBINE ENGINE

(71) Applicant: SAFRAN TRANSMISSION SYSTEMS, Colombes (FR)

(72) Inventors: Juan-Luis Marcos Izquierdo, Moissy-Cramayel (FR); Antoine Jacques Marie Pennacino, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 236 days.

(21) Appl. No.: 18/720,025

(22) PCT Filed: Dec. 14, 2022

(86) PCT No.: PCT/FR2022/052360
§ 371 (c)(1),
(2) Date: Jun. 14, 2024

(87) PCT Pub. No.: WO2023/111459
PCT Pub. Date: Jun. 22, 2023

(65) Prior Publication Data
US 2026/0177141 A1 Jun. 25, 2026

(30) Foreign Application Priority Data
Dec. 16, 2021 (FR) ...................................... 2113695

(51) Int. Cl.
*F16H 57/04* (2010.01)
*F02C 7/06* (2006.01)
*F16H 57/08* (2006.01)

(52) U.S. Cl.
CPC ............ *F16H 57/045* (2013.01); *F02C 7/06* (2013.01); *F16H 57/0479* (2013.01);
(Continued)

(58) Field of Classification Search
CPC ............ F16H 57/0479; F16H 57/0482; F16H 57/0486; F16H 57/082; F16H 2057/085;
(Continued)

(56) References Cited

U.S. PATENT DOCUMENTS 5,107,676 A * 4/1992 Hadaway ............ F16H 57/0434 60/39.08
8,256,318 B2 * 9/2012 Vassaux .............. F16H 57/0431 184/6.12
(Continued)

FOREIGN PATENT DOCUMENTS

EP 3851653 A1 7/2021

OTHER PUBLICATIONS

International Search Report in corresponding International Patent Application No. PCT/FR2022/052360, mailed Feb. 13, 2023, 2 pages, English Translation.

*Primary Examiner* — Henry Y Liu
(74) *Attorney, Agent, or Firm* — Cozen O'Connor

(57) ABSTRACT

An oil collector for a mechanical reduction gear of a turbomachine includes a body having two opposing side surfaces each configured to extend partly around a planet of said reduction gear, and an internal cavity for oil circulation. The collector also has at least one tongue removably mounted on the body, the tongue extending from the body in the extension of at least one side surface and intended to be at least partially engaged in an annular groove of a sun gear of the reduction gear.

11 Claims, 6 Drawing Sheets

(52) U.S. Cl.
CPC ..... *F16H 57/0482* (2013.01); *F16H 57/0486* (2013.01); *F16H 57/082* (2013.01); *F05D 2260/40311* (2013.01); *F16H 2057/085* (2013.01)

(58) Field of Classification Search
CPC . F16H 57/045; F02C 7/06; F05D 2260/40311
See application file for complete search history.

(56) References Cited

U.S. PATENT DOCUMENTS

| | | | | |
|---|---|---|---|---|
| 8,747,272 | B2 * | 6/2014 | Imai | B64C 25/405 475/159 |
| 9,038,779 | B2 * | 5/2015 | McCune | F16H 57/0423 184/6.11 |
| 9,291,255 | B2 * | 3/2016 | Imai | B64C 27/12 |
| 9,404,420 | B2 * | 8/2016 | Gallet | F16H 57/0456 |
| 10,202,902 | B2 * | 2/2019 | McCune | F16H 57/0423 |
| 10,458,279 | B2 * | 10/2019 | Gedin | F16H 57/0427 |
| 10,724,445 | B2 * | 7/2020 | Sheridan | F02K 3/06 |
| 10,808,828 | B2 * | 10/2020 | Yoshitomi | F16H 57/04 |
| 10,975,952 | B2 * | 4/2021 | Simon | F16H 1/2863 |
| 11,022,209 | B2 * | 6/2021 | Baraggia Au Yeung | F16H 57/0486 |
| 11,067,162 | B2 * | 7/2021 | McCune | F02C 7/36 |
| 11,085,510 | B2 * | 8/2021 | Pennacino | F16H 55/17 |
| 11,131,249 | B2 * | 9/2021 | Di Giovanni | F16C 37/007 |
| 11,208,958 | B2 * | 12/2021 | Sheridan | F16H 1/28 |
| 11,242,925 | B2 * | 2/2022 | Di Giovanni | F16H 57/0421 |
| 11,248,695 | B2 * | 2/2022 | Meyer | F16H 57/043 |
| 11,326,555 | B2 * | 5/2022 | Uhkoetter | F16H 57/046 |
| 11,339,724 | B2 * | 5/2022 | Di Giovanni | F16H 57/0479 |
| 11,536,204 | B2 * | 12/2022 | Sheridan | F01D 25/16 |
| 2009/0078075 | A1 * | 3/2009 | Vassaux | F16H 57/0431 74/467 |
| 2013/0095974 | A1 * | 4/2013 | Imai | F02C 7/36 475/159 |
| 2015/0065285 | A1 * | 3/2015 | McCune | F16H 57/0482 475/159 |
| 2015/0167819 | A1 * | 6/2015 | Imai | B64C 27/12 475/159 |
| 2015/0300255 | A1 * | 10/2015 | Gallet | F16H 57/0479 475/159 |
| 2016/0146102 | A1 * | 5/2016 | McCune | F02C 7/36 415/122.1 |
| 2018/0216722 | A1 * | 8/2018 | Yoshitomi | F16J 15/4472 |
| 2018/0258794 | A1 * | 9/2018 | Gedin | F02C 7/36 |
| 2019/0271385 | A1 * | 9/2019 | Baraggia Au Yeung | F16H 57/0409 |
| 2019/0293026 | A1 * | 9/2019 | Uhkoetter | F16H 57/043 |
| 2019/0376595 | A1 * | 12/2019 | Meyer | F16H 57/0486 |
| 2020/0025068 | A1 * | 1/2020 | McCune | F16H 57/0479 |
| 2020/0032716 | A1 * | 1/2020 | Di Giovanni | F16C 19/54 |
| 2020/0032893 | A1 * | 1/2020 | Simon | F16H 1/2863 |
| 2020/0132167 | A1 * | 4/2020 | Pennacino | F16H 1/36 |
| 2020/0166118 | A1 * | 5/2020 | Di Giovanni | F16H 57/0482 |
| 2020/0166121 | A1 * | 5/2020 | Di Giovanni | F16H 57/0479 |

* cited by examiner

OIL MANIFOLD FOR A MECHANICAL REDUCTION GEAR OF A TURBINE ENGINE

CROSS-REFERENCE TO RELATED APPLICATIONS

This application is a US National phase Application of PCT/FR2022/052360 filed Dec. 14, 2022, which claims priority to French Patent Application No. 2113695 filed Dec. 16, 2021, both of which are hereby incorporated in their entirety.

TECHNICAL FIELD OF THE INVENTION

The invention relates to an oil collector for a mechanical reduction gear of a turbomachine.

BACKGROUND

FIG. 1 illustrates a dual-flow turbojet engine 1 of axis X of the prior art, which comprises, from upstream to downstream along the direction in which the gas flow circulates within the turbomachine: a fan 2, a low pressure compressor 3, a high pressure compressor 4, a combustion chamber 5, a high pressure turbine 6, and a low pressure turbine 7. The air flow entering the fan is divided into a primary air flow passing through compressors 3, 4, combustion chamber 5, and turbines 6, 7, and a secondary air flow flowing externally to the primary air flow.

High pressure compressor 4 is coupled to high pressure turbine 6 by means of what is referred to as a high pressure shaft 8, the assembly forming a high pressure body. Low pressure compressor 3 is coupled to low pressure turbine 7 by means of what is referred to as a low pressure shaft 9, the assembly forming a low pressure body.

Fan 2 is rotated by a fan shaft 10 coupled to low pressure shaft 9, by means of a mechanical reduction gear 11. Reduction gear 11 allows fan 2 to rotate at a lower speed than the other elements of the low pressure body, which makes it possible to improve the efficiency of the turbomachine. Reduction gear 11 must transmit the driving power to the fan while ensuring the requested speed ratio, while satisfying size and weight constraints.

FIGS. 2 and 3 schematically illustrate the general structure of a mechanical reduction gear 11. This conventionally comprises a sun gear 12 (also called a sun wheel), a ring gear 13 (also called an outer gear ring) coaxial with sun gear 12, planets 14 meshing with both sun gear 12 and ring gear 13, and a planet carrier 15 comprising bearings 16 around which planets 14 are rotatably mounted.

There are several architectures for mechanical reduction gears 11. In the state of the art of dual-flow turbomachines, the reduction gears are planetary or epicyclic. In other similar applications, differential or "compound" architectures exist.

In an epicyclic reduction gear, ring gear 13 is fixed and planet carrier 15 constitutes the output shaft of reduction gear 11 which rotates in the same direction as sun gear 12. In such a configuration, the set of planets 14 drives the rotation of planet carrier 15 around the X axis of turbomachine 1. Ring gear 13 is fixed to the stator or motor housing and planet carrier 15 is fixed to shaft 9 of fan 2.

In a planetary reduction gear, planet carrier 15 is fixed and ring gear 13 constitutes the output shaft of reduction gear 11 which rotates in the opposite direction to sun gear 12. In such a configuration, the set of planets 14 is held by a planet carrier 15 which is fixed to the stator or motor housing. Each planet 14 drives ring gear 13 which is attached to shaft 9 of fan 2.

In a differential reduction gear, no elements are rotationally fixed. Ring gear 13 rotates in the opposite direction to sun gear 12 and to planet carrier 15.

Mechanical reduction gears may be composed of one or more stages of meshing. Meshing is ensured in various ways, such as by contact, by friction, or by magnetic fields. There are also several types of meshing by contact, such as straight or helix teeth.

As illustrated in FIG. 4, sun gear 12 and/or planets 14 may each comprise two toothed areas 12*a* which are axially separated from one another by an annular groove 12*b*.

Such a reduction gear 11 must be supplied with oil during operation in order to ensure the cooling and lubrication of the various elements of reduction gear 11. For this purpose, reduction gear 11 comprises lubricating means 17 which in particular comprise oil distribution channels (not shown) for conveying cold oil $H_F$ from an oil reservoir to the meshing areas of reduction gear 11.

The oil is heated during the operation of reduction gear 11, the hot oil $H_C$ tending to be guided towards an internal area of reduction gear 11, in particular into the area delimited by two adjacent planets 14. In order to ensure good drainage and as illustrated in FIG. 5, collectors 18 may be mounted in these areas. Only one collector 18 is shown in this figure, although a collector 18 may be placed in each space located circumferentially between two planets 14. Each planet 18 comprises a body 19. Body 19 is for example fixed to planet carrier 15 and comprises two rounded and concave side surfaces 20 positioned facing the teeth of the corresponding adjacent planets 14. Body 19 further comprises an internal cavity 21 (FIG. 9) for oil circulation, fluidly connected to an oil drainage channel.

During operation, a phenomenon of oil and particle recirculation or stagnation is observed at sun gear 12, in particular in groove 12*b*, generating poor elimination of heat energy and potentially causing degradation or loss of performance.

The invention aims to remedy such a disadvantage, in a simple, reliable, and inexpensive manner.

Document FR 3 088 978 discloses a collector for a mechanical reduction gear in which the concave side walls comprise projecting tongues extending into the annular grooves of circumferentially adjacent planets in order to reduce the recirculation phenomena at said planets.

SUMMARY

This document proposes an oil collector for a mechanical reduction gear of a turbomachine, comprising a body comprising two longitudinal ends connected by two opposing side surfaces each configured to extend partly around a planet of said reduction gear, the body further comprising an internal cavity for oil circulation, characterized in that the collector comprises at least one tongue removably mounted on the body, said tongue extending from the body, at one of the two longitudinal ends, in the extension of at least one side surface and the tongue intended to be at least partially engaged in an annular groove of a sun gear of the reduction gear.

Such a collector is thus equipped with a tongue capable of limiting the recirculation phenomena at the groove of the sun gear, and not at the grooves of the planets, as is the case in the prior art. Furthermore, the fact that the tongue is removable facilitates, or in certain cases enables, the mounting of such a collector within a mechanical reduction gear.

In addition, in the event of damage to the tongue, it is possible to change only the tongue without having to replace the body of the collector.

The tab may have an oil guide surface which lies in the extension of the corresponding side surface of the collector.

The oil guide surface may be a curved surface, for example concave.

The oil guide surface may be continuous with the surface and slope of the corresponding side surface of the collector, unlike the prior art presented above where the tongue projects relative to the corresponding side surface of the collector.

The side surface of the collector may be cylindrical. The side surface of the collector may have a diameter greater than the diameter of the adjacent planet.

The tongue may be manufactured by additive manufacturing or forging for example.

The tongue may have a concave surface, for example in the form of a cylinder portion, intended to be facing towards the bottom of the sun gear's groove and separate from the oil guide surface.

The tab may be fixed to the body by means of a screw.

Said screw may engage with a nut provided in the form of an insert fixedly mounted on the body.

The insert may be crimped or soldered to the body.

Alternatively, said screw may engage with a tapping in the body.

The screw comprises a head housed, for example integrally, in a recess, milling, or countersink hole in the body. In this manner, said head does not hinder the flow of oil over the corresponding surface of the tongue.

Said recess, milling, or countersink hole in the body may be at least partially filled by a plug comprising a surface which lies in the extension of or is flush with a surface of the tongue.

In the case of a countersink hole, it may have a cylindrical shape.

In the case of milling, it may have a conical or frustoconical shape.

The plug may be formed by a flexible or rigid part, mounted in said recess, milling, or countersink hole.

Alternatively, said plug may be formed by a material introduced in gel, powder, or paste form or in liquid form into said recess, milling, or countersink hole, said material next being at least partially cured. Said material may be silicone-based.

The collector may comprise an anti-unscrewing sleeve capable of preventing the unscrewing of the screw attaching the tongue. Alternatively, the anti-unscrewing function may be provided by the plug.

The tongue may be symmetrical relative to a longitudinal midplane of said tongue. Alternatively, said tongue may be asymmetrical relative to said longitudinal midplane.

The invention also relates to a mechanical reduction gear for a turbomachine extending along an axis, comprising a sun gear, a ring gear, and planets meshing with the sun gear and ring gear, the planets being held by a planet carrier, the sun gear comprising two toothed areas which are axially separated from one another by an annular groove, characterized in that it comprises at least one collector of the aforementioned type of which the body is mounted circumferentially between two planets and radially between said planets and the sun gear, the tongue being at least partially engaged in said annular groove of the sun gear.

The tongue may extend over a portion that is between 25 and 90% of the width of said groove.

It is thus possible to adapt the amount of fluid drained from the groove by means of the tongue, by adjusting its width in relation to the width of the groove. Furthermore, reducing the width of the tongue also makes its assembly or disassembly easier.

The groove may have two side surfaces or flanks, the tongue comprising its two opposing side surfaces extending respectively facing each of the flanks of the groove, a clearance of between 0.5 and 5 mm being formed between each side surface of the tongue and the corresponding flank.

This document also relates to a method for assembling a reduction gear of the aforementioned type, characterized in that it comprises the steps of:

- mounting at least one body of at least one collector on a support,
- mounting the sun gear on said support,
- mounting the tongue on said body so that it extends at least partially into the groove of the sun gear,
- mounting the planets on the planet carrier.

DETAILED DESCRIPTION OF THE INVENTION

Figure 1:
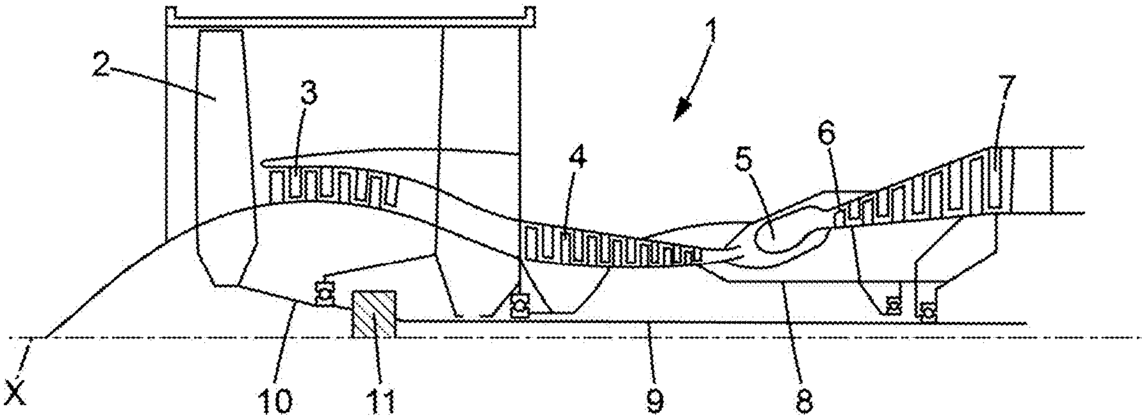
FIG. 1 is a half-view in axial section of a turbomachine of the prior art.
Figure 2:
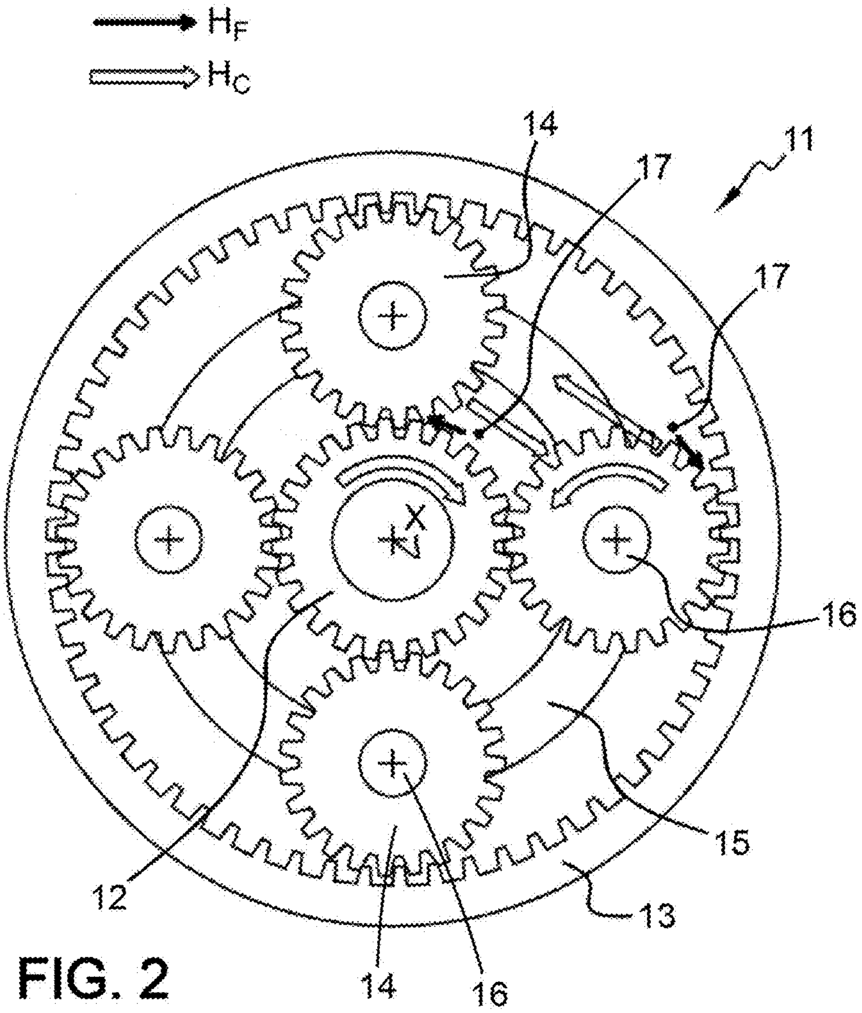
FIG. 2 is a schematic view of a mechanical reduction gear of the prior art.
Figure 3:
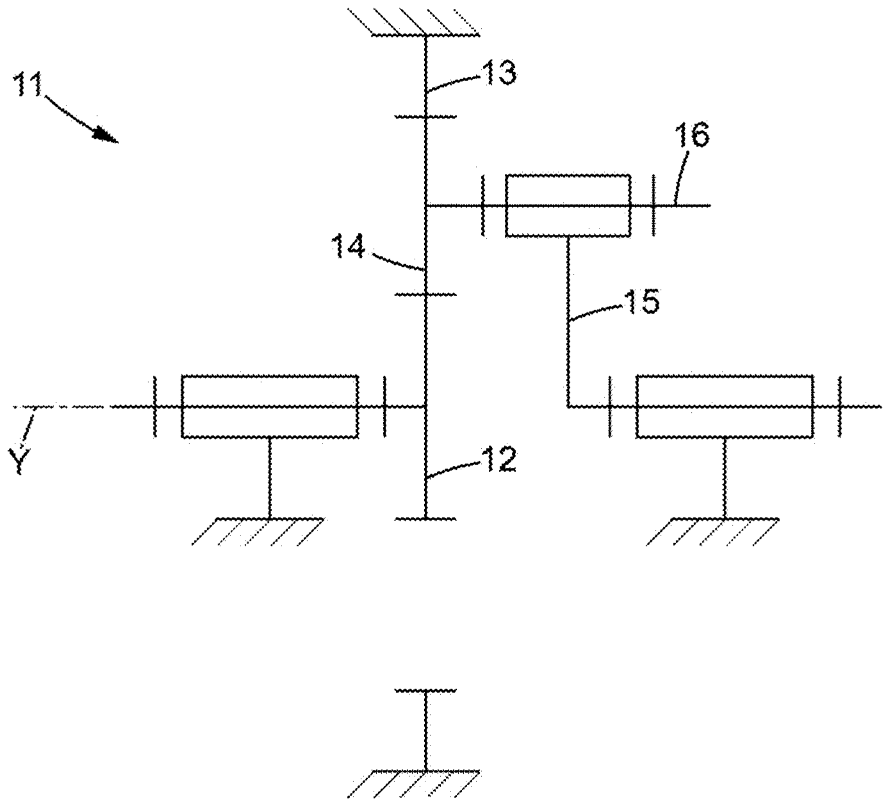
FIG. 3 is a kinematic diagram of the reduction gear of FIG. 2.
Figure 4:
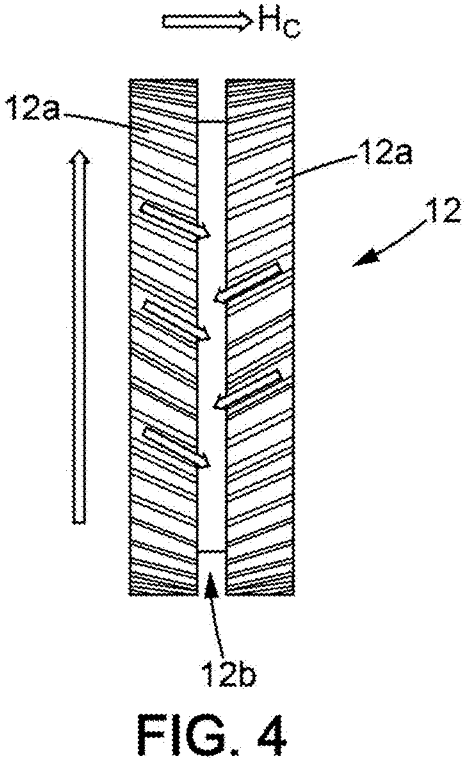
FIG. 4 is a side view of the sun gear.
Figure 5:
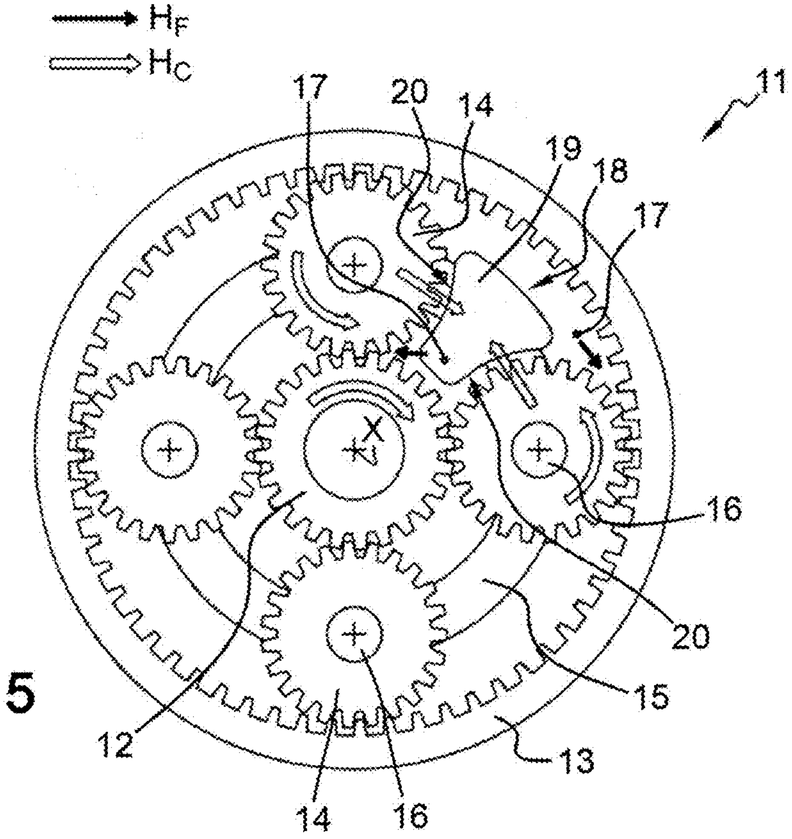
FIG. 5 is a view corresponding to FIG. 2, of a mechanical reduction gear equipped with collectors in accordance with the prior art.
Figure 6:
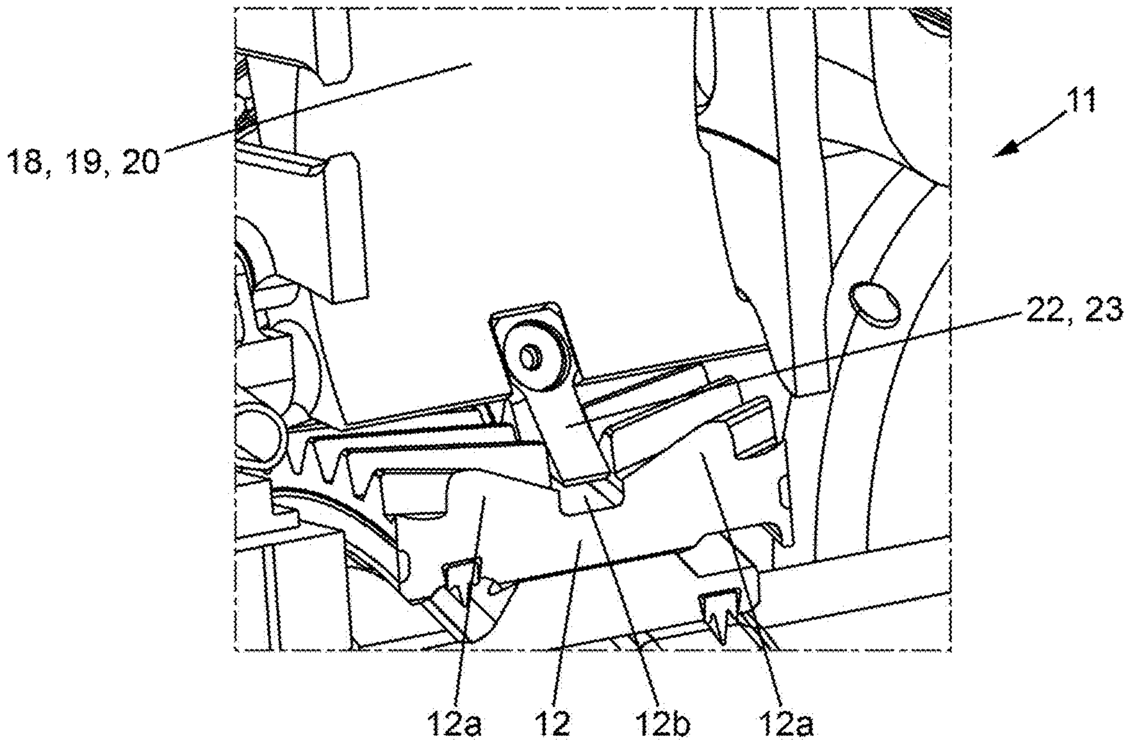
FIG. 6 is a perspective view of a portion of a mechanical reduction gear according to this document.
Figure 7:
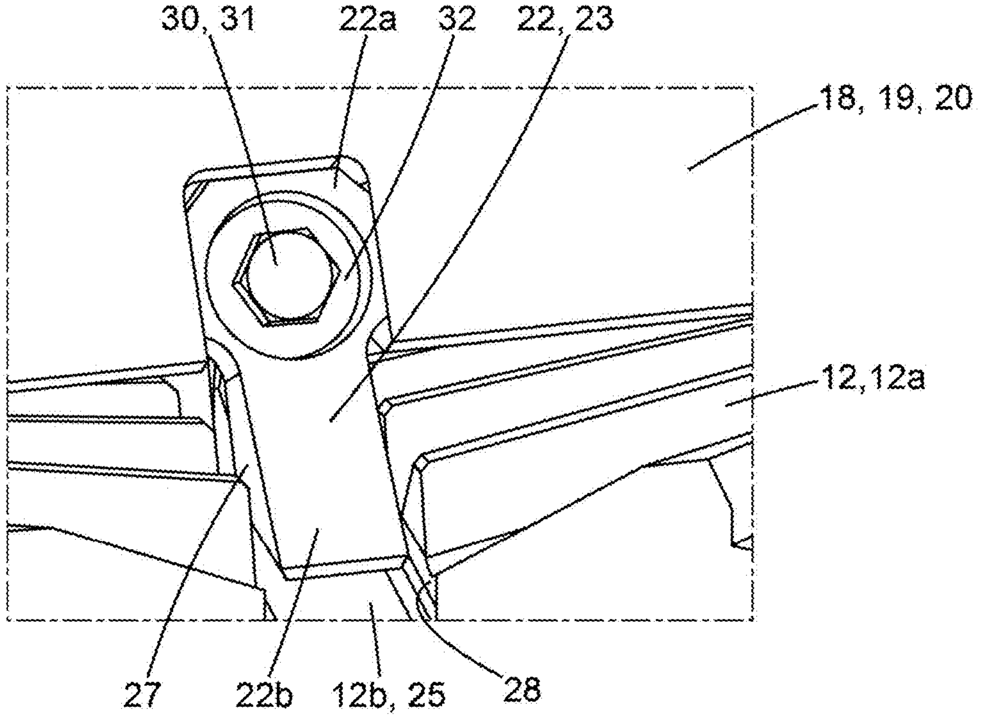
FIG. 7 is a detailed view of the tongue of the reduction gear of FIG. 6.

FIGS. 6 and 7 illustrate a portion of a mechanical reduction gear 11 according to one embodiment of the invention. This comprises, as above, a sun gear 12, a ring gear 13, and planets 14 meshing with sun gear 12 and with ring gear 13, planets 14 being held by a planet carrier 15. Sun gear 12 comprises two toothed areas **12*a* which are axially separated from one another by an annular groove 12*b*. Reduction gear 11 further comprises oil collectors 18 each mounted circumferentially between two planets 14 and radially between said planets 14 and sun gear 12**.

Each oil collector 18 has a body 19 comprising two opposing side surfaces 20, of concave shape and resembling a portion of a cylinder, each configured to extend partly around a planet 14. The body also comprises an internal cavity for oil circulation 21 and a tongue 22 formed by a part that is separate from body 19 and removably mounted on body 19.

Tongue 22 has an elongate shape and extends generally radially between a radially outer end 22*a* fixed to the body and a radially inner end 22*b* engaged in the groove.

Tongue 22 comprises a curved concave oil guide surface 23, in the shape of a portion of a cylinder, having a surface and slope that are continuous with the corresponding side surface 20 of collector 18.

Radially inner end 22*b* of tongue 22 comprises another surface, namely a curved concave end surface 24 in the shape of a portion of a cylinder, which extends facing the cylindrical bottom surface 25 of groove 12. A clearance 26 may be formed between end surface 24 of tongue 22 and bottom surface 25 of groove 12 *b*. Clearance 26 may be between 1 and 5 mm.

Figure 8:
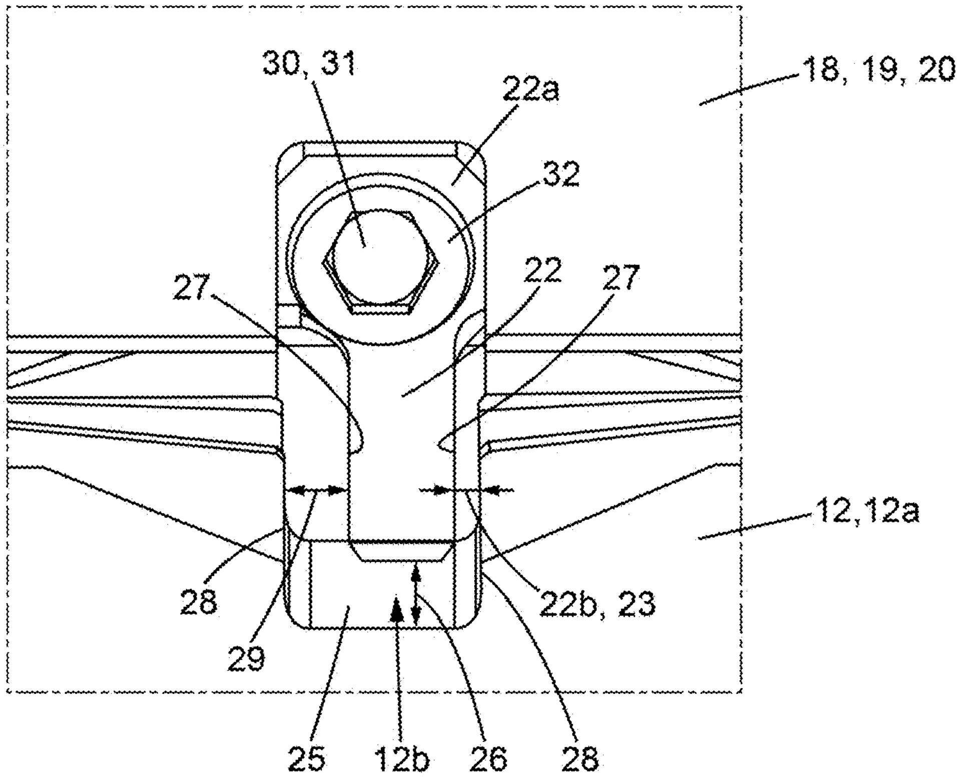
FIG. 8 is a detailed view of a reduction gear according to another embodiment.

The radially inner end of tongue 22 further comprises two side surfaces 27 extending respectively facing each of the side surfaces or flanks 28 of groove 12*b* of sun gear 12, a clearance 29 able to be formed between each pair of surfaces 27, 28. Clearance 29 may be between 0.5 and 5 mm. Clearance 29 may be the same (FIG. 7) or different (FIG. 8) from one side surface 28 to another.

The tongue may be symmetrical or asymmetrical. In other words, clearance 29 may be the same or different on the two sides of end 22*b*.

In the case of a different clearance 29 (FIG. 8), corresponding to an asymmetrical tongue 22, this may further facilitate the assembly or disassembly of tongue 22 in groove 12*b*.

Figure 9:
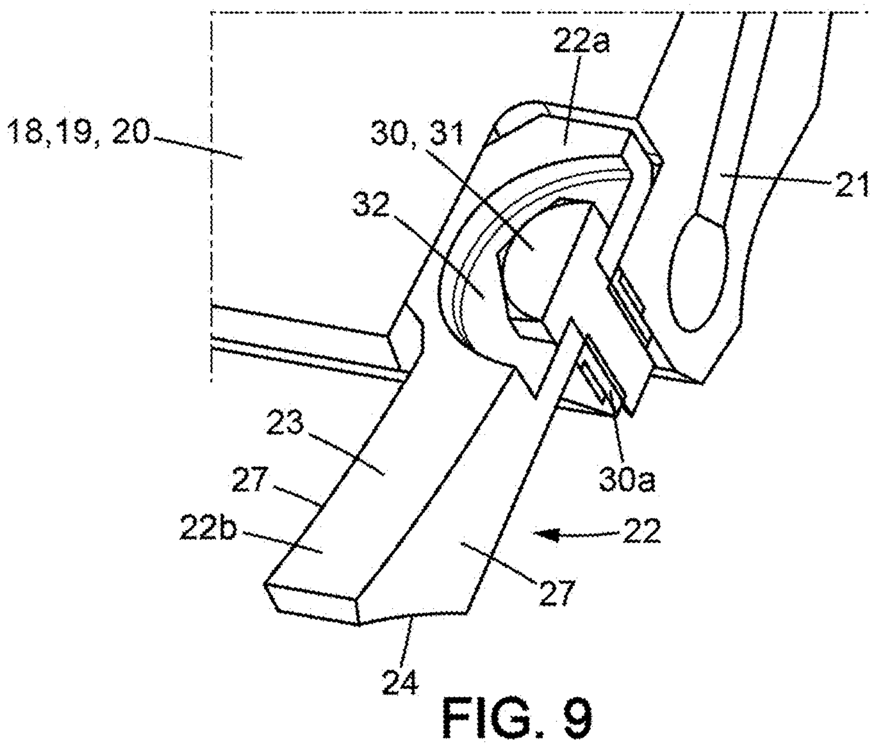
FIG. 9 is a section view of a portion of a reduction gear according to this document.

Tongue 22 is for example fixed on body 19 by means of a screw 30. Screw 30 may engage with a nut in the form of an insert 30*a* (FIG. 9) fixedly mounted on body 19.

Insert 30*a* may be crimped or soldered onto body 19.

Screw 30 comprises a head 31 integrally housed in a recess 32 formed by a countersink hole in body 19. Countersink hole 32 is of cylindrical shape in the case of FIGS. 7 to 10. Of course, recess 32 may be present in other shapes.

Figure 10:
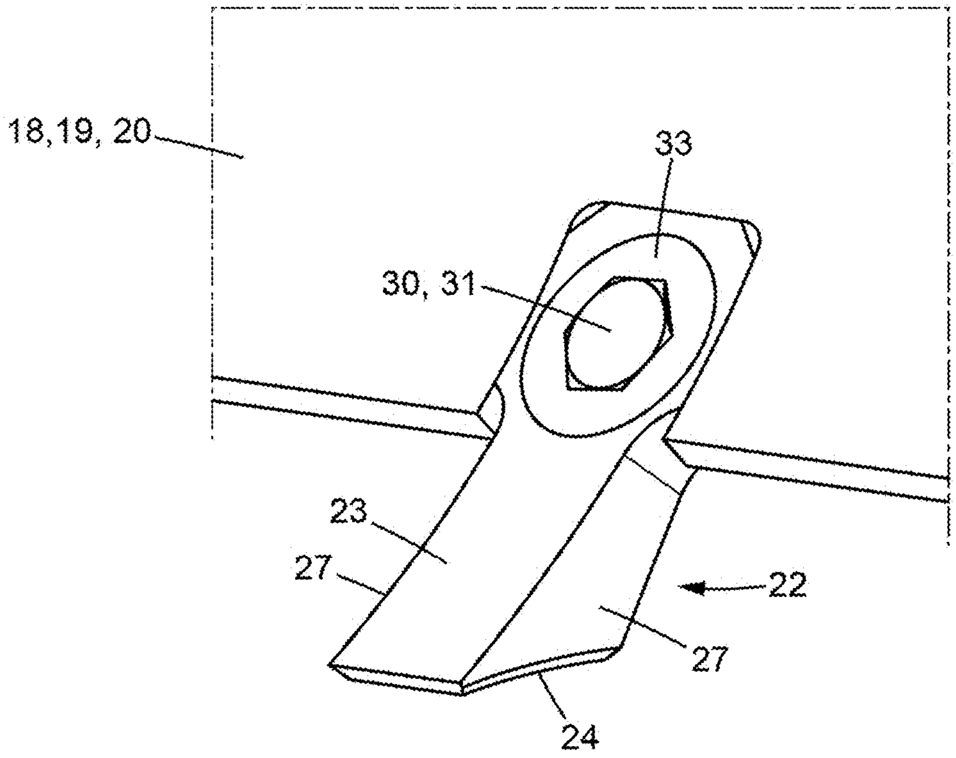
FIG. 10 is a detailed view illustrating another embodiment.

As illustrated in FIG. 10, recess 32 may be filled, at least partially, by a plug 33 having a surface that lies in the extension of a surface of tongue 22. Plug 33 may be formed by a flexible or rigid part mounted in recess 32. Alternatively, plug 33 may be formed by a material introduced in gel, powder, or paste form or in liquid form into recess 32, said material next being at least partially cured. Said material may be silicone-based.

Figure 11:
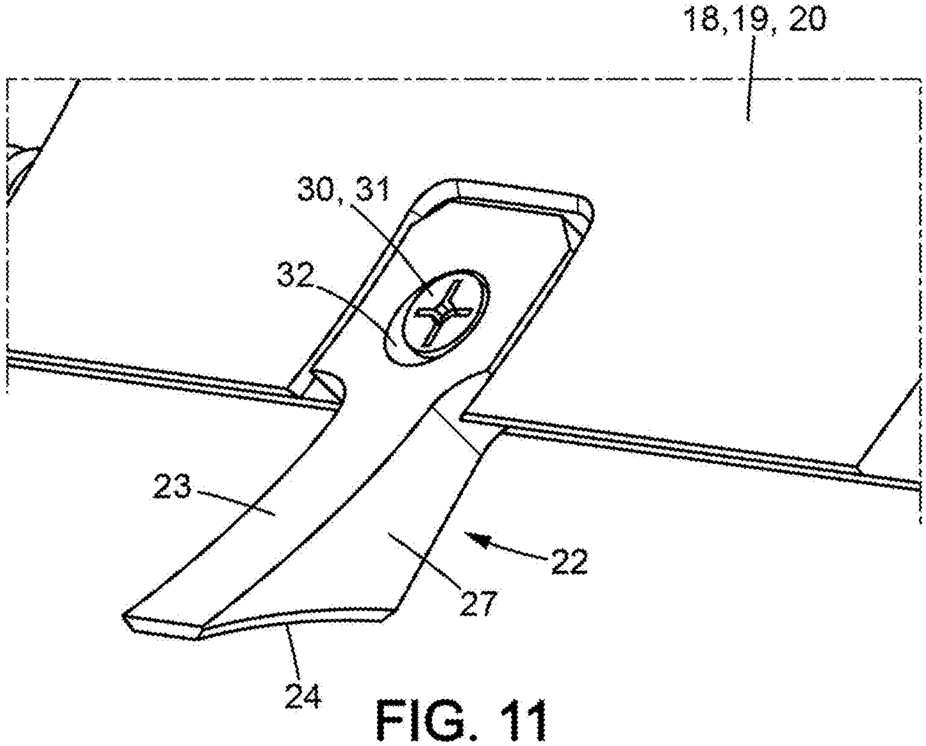
FIG. 11 is a detailed view illustrating yet another embodiment.

FIG. 11 illustrates the case where recess 32 is a milling of frustoconical shape, head 31 of screw 30 being of complementary shape.

Such a collector 18, equipped with a tongue 22, makes it possible to limit the recirculation phenomena at groove 12*b* of sun gear 12 in an effective manner. Furthermore, the fact that tongue 22 is removable facilitates, or in certain cases makes possible, the mounting of such a collector 18 within a mechanical reduction gear 11.

Such mounting may be carried out by successively mounting body 19 of each collector 18 on a support, mounting sun gear 12, then mounting tongue 22 on each body 19 so that it extends at least partially into the groove in the sun gear, and finally mounting planets 14 on planet carrier 15.

In the event of damage to tongue 22, it is possible to change only tongue 22 without having to replace body 19 of collector 18.

The invention claimed is:

1. An oil collector (18) for a mechanical reduction gear (11) of a turbomachine, comprising:

a body (19) comprising:

two longitudinal ends connected by two opposing side surfaces (20) each configured to extend around a planet (14) of said reduction gear (11), and an internal cavity (21) for oil circulation, and at least one tongue (22) removably mounted on the body (19), said tongue (22) extending from the body (19), at one of the two longitudinal ends, in the extension of at least one side surface (20) and the tongue (22) intended to be at least partially engaged in an annular groove (12*b*) of a sun gear (12) of the reduction gear (11).

2. The collector (18) according to claim 1, wherein the tongue (22) is fixed to the body (19) by means of a screw (30).

3. The collector (18) according to claim 2, wherein said screw (30) engages with a nut provided in the form of an insert (30*a*) fixedly mounted on the body (19).

4. The collector (18) according to claim 2, wherein the screw comprises a head (31) housed in a recess (32), milling, or countersink hole in the body (19).

5. The collector (18) according to claim 4, wherein said recess (32), milling, or countersink hole in the body (19) is at least partially filled by a plug (33) comprising a surface which is flush with a surface (23) of the tongue (22).

6. The collector (18) according to claim 1, wherein said tongue (22) is symmetrical relative to a longitudinal midplane of said tongue (22).

7. A mechanical reduction gear (11) for a turbomachine extending along an axis (X), comprising:

a sun gear (12), a ring gear (13), and planets (14) meshing with the sun gear (12) and ring gear (13), the planets (14) being held by a planet carrier (14), the sun gear (12) comprising two toothed areas (12*a*) which are axially separated from one another by an annular groove (12*b*), the mechanical reduction gear further comprising at least one collector (18) according to claim 1 of which the body (19) is mounted circumferentially between two planets (14) and radially between said planets (14) and the sun gear (12), the tongue (22) being at least partially engaged in said annular groove (12*b*) of the sun gear (12).

8. A reduction gear (11) according to claim 1, wherein the tongue (22) extends over a portion that is between 25 and 90% of the width of said groove (12*b*).

9. A reduction gear (11) according to claim 8, wherein the groove (12*b*) has two flanks (28), the tongue (22) comprising its two opposing side surfaces (27) extending respectively facing each of the flanks (28) of the groove (12*b*), a clearance (29) of between 0.5 and 5 mm being formed between each side surface (27) of the tongue (22) and the corresponding flank (28).

10. A method for assembling a reduction gear (11) according to claim 7, characterized in that it comprises the steps of:

mounting at least one body (19) of at least one collector (18) on a support, mounting the sun gear (12) on said support, mounting the tongue (22) on said body (19) so that it extends at least partially into the groove (12*b*) of the sun gear (12), mounting the planets (14) on the planet carrier (14).

11. An oil collector (18) for a mechanical reduction gear (11) of a turbomachine, comprising:

a body (19) comprising:

two longitudinal ends connected by two opposing side surfaces (20) each configured to extend around a planet (14) of said reduction gear (11), and an internal cavity (21) for oil circulation, and at least one tongue (22) fixed to the body (19) by means of a screw (30), said tongue (22) extending from the body (19), at one of the two longitudinal ends, in the extension of at least one side surface (20) and the tongue (22) intended to be at least partially engaged in an annular groove (12*b*) of a sun gear (12) of the reduction gear (11).

* * * * *